United States Patent
Light et al.

[11] Patent Number: 6,061,337
[45] Date of Patent: *May 9, 2000

[54] SYSTEM AND METHOD FOR CDMA HANDOFF USING TELEMETRY TO DETERMINE THE NEED FOR HANDOFF AND TO SELECT THE DESTINATION CELL SITE

[75] Inventors: Jeffrey Ross Light, Lincolnwood; Chung-Zin Liu, Naperville; Charles Varvaro, Glendale Heights, all of Ill.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/759,332

[22] Filed: Dec. 2, 1996

[51] Int. Cl.[7] ........................................................ H04Q 7/22
[52] U.S. Cl. ............................................ 370/331; 455/440
[58] Field of Search ..................................... 370/331, 334, 370/335; 455/440, 437; 342/364

[56] References Cited

U.S. PATENT DOCUMENTS 3,663,762  5/1972  Joel, Jr. ..................................... 455/440
5,260,943  11/1993 Comroe et al. ............................. 370/33
5,293,642  3/1994  Lo ............................................. 455/456
5,327,575  7/1994  Menich et al. ............................ 455/437
5,345,467  9/1994  Lomp et al. ............................... 370/331
5,614,914  3/1997  Bolgiano et al. .......................... 342/364
5,649,308  7/1997  Andrews .................................... 370/334

*Primary Examiner*—Edwin C. Holloway, III
*Attorney, Agent, or Firm*—Michael B. Johannesen; Neil R. Ormos

[57] ABSTRACT

A system and method for measuring the approximate distance and direction of a mobile unit from a plurality of cells in order to determine whether and how to handoff the mobile unit and which cell may be the best serving cell. The CDMA timing system is used to provide an estimate of the subscriber's location to be determined by a CDMA base station. A distance calculation is made by the serving cell site sending a request for signal strength message to a mobile unit. The mobile unit measures pilot signal strength and a time offset from the expected time of such pilot signals. The signal strength and time offsets are returned to the cell site. a processor in the system can then determine if a handoff is really desirable, and with which of the cell sites is the best serving all for the mobile unit the mobile unit with a high degree of confidence that the call will be maintained. Also, an adaptive database may be implemented wherein a mobile unit is tracked to the edge of the coverage area and, a database is kept of successful handoffs to another carrier.

15 Claims, 3 Drawing Sheets

SYSTEM AND METHOD FOR CDMA HANDOFF USING TELEMETRY TO DETERMINE THE NEED FOR HANDOFF AND TO SELECT THE DESTINATION CELL SITE

TECHNICAL FIELD

This invention relates to the field of code-division, multiple-access (CDMA) wireless telephony and, more specifically, to using telemetry to aid such CDMA systems in handoff decision making to insure optimal handoffs.

BACKGROUND OF THE INVENTION

Code-division multiple-access (CDMA) wireless communication is becoming the digital system of choice for upgrading or overlaying current analog wireless communication systems. CDMA provides many times the call handling capacity over analog cellular communications systems. See, for example, "An Overview Of The Application Of Code Division Multiple Access (CDMA) To Digital Cellular Systems And Personal Cellular Networks," May 21, 1992, available from Qualcomm, Inc., 10555 Sorrento Valley Road, San Diego, Calif. Briefly, a CDMA system transmits/receives voice or data in data packets between a mobile unit and a base station over a spread spectrum signal. A speech handler translates the CDMA data packets into and out of a digital 64 Kbps pulse-code modulated (PCM) stream for use in the standard connection-based digital public switch telephone network (PSTN). CDMA cellular communication is more fully described in documents from Qualcomm, Inc. ("The Wideband Spread Spectrum Digital Cellular System Dual Mode Mobile Station-based Station Compatibility Standard" and "CDMA Digital Common Error Interface Standard," revision 1.0, October, 1993).

As a CDMA mobile unit traverses a geographic area served by a CDMA wireless system, a call is handled by a progression of cell sites or sectors of cell sites, which keeps the call active in a predetermined region of the total geographical area. Changing from one sector or cell site to another is known in the art as a "handoff." One of the major advantages of CDMA is the ability to provide "soft" handoffs; that is, a handoff without a user-detectable disruption of communication. Such soft handoffs are facilitated by multiple cell site or sector transceivers being involved in the call at the same time during the handoff.

Turning to FIG. 1, a CDMA handoff is demonstrated. Each cell site (for example, cell site 1-1) provides voice communications with mobile units, such as 6, within its area, and performs several other tasks as well. A controlling cell site causes all mobile units it is serving to synchronize their internal clocks to the cell site's master clock. Such synchronization is required (see the standards cited above) in order to provide system functionality. One of the areas requiring clock synchronization is pilot signal reading. While mobile unit 6 is in cell 1 under control of cell site 1-1, cell site 1-1 sends a list of adjacent cells (the "neighbor list") to mobile unit 6 as possible candidate handoff cells. Cell site 1-1 then causes mobile unit 6 to check periodically signal strength of the pilot signals being broadcast by adjacent cell (or sectors).

Each cell site or sector broadcasts a pilot signal sequence, starting at a predetermined time offset. The mobile unit determines the signal strength of the pilot signal from the respective cell site or sector of the controlling cell site and the cell sites or sectors on the neighbor list. When mobile 6 detects that the signal strength mobile 6 is receiving of a pilot signal has exceeded a predetermined threshold, then the mobile unit reports the signal strengths for the cell sites on its neighbor list. A handoff may be requested by the cell site sector to a cell site with the strongest pilot signal. The call is then shared in a soft handoff mode between the original sector or cell site and the neighbor sector or cell site, until the signal strength from one of the sharing cell sites or sectors falls below another threshold. If a new cell site or sector becomes the controller, then the clock in the mobile is resynchronized and a new neighbor list is delivered. This handoff procedure is specified in the above references (also see IS 95 standard and U.S. Pat. Nos. 5,363,369, 5,434,853, 5,434,854, and 5,438,565), and described below.

One of the great advantages of CDMA is that, during handoff in a "soft" handoff mode, more than one cell site or sector is receiving content bearing packets. Multiple sets of packets are delivered to a central location (for example, MTSO 16), where a decision is made as to which packet has a stronger signal indication (the signal strength being a parameter encoded in each packet). MTSO 16 then chooses the packet with the stronger signal and sends it to public switched telephone network 18. Likewise, in the opposite direction, content from PSTN 18 arrives at MTSO 16, which, realizing that the packet is for mobile 6 in handoff mode, copies the packet and sends it to both cell sites or sectors involved in the handoff (in this example cell sites 1-1 and cell 3-3). Mobile 6 will receive both packets and translate the stronger packet into whatever content (audio or data) the user is expecting.

When a mobile unit reaches the end of a geographic coverage region, the system performs what is known in the art as a hard handoff. A hard handoff usually occurs when the connection between the mobile unit and the public switched telephone network changes (due to a change in frequency/operating mode, frame offset, etc.). In this scenario, the mobile is dropped from one system and added to another system as if a call were being initiated or, alternatively, a handoff may be prearranged with the new service provider through interservice provider protocol. Such hard handoffs are usually perceived by the user as an interruption in service and, if not carefully established, can result in loss of the telephone call.

Digital wireless systems (such as CDMA) are being deployed in urban areas first; primarily where analog systems are overloaded. However, large urban areas cause problems for CDMA system handoffs because signal strength measurements can vary rapidly as the mobile unit moves. For example, the mobile may move into a viaduct or bridge, or near a truck, building or other obstacle which interferes with microwave transmission/reception. Buildings and other objects blocking the most direct signal path between the cell sites and the mobile create "multipath" (which is the same problem that causes "ghosts" on broadcast television channels in most cities) caused by the signal from the mobile unit reflecting off of objects. Thus, the mobile may receive multiple signals for the same pilot, and, because of multipath interference, receive a "weaker" pilot signal (larger time offset) than actual distance between the mobile and all sites would normally indicate. In some instances, the CDMA system may be able to distinguish among the various multipath signals if the time between reception of the multiple paths exceeds the resolution bandwidth by the process of "rake review," as known in the art.

Thus, in areas where multipath is a problem, a CDMA mobile unit may detect a lower pilot signal from its currently serving cell site, even though it is fairly close to the cell site, and, as a result, a determination is made that a handoff is needed. At the same time, the mobile unit may have greater pilot signal strength indications for the neighbor list cell sites or sectors for the same reason. Such an inaccuracy may result in the call being handed off to a cell site or sector that is not the best candidate, even though its signal strength may indicate that it is the best candidate when the mobile moves again, the received signal strength may vary again, causing a further handoff initiation. As a result, calls may be dropped or lost.

Further, when a mobile unit reaches the edge of a CDMA coverage area, there may be (and frequently will be during the early stages of deployment) a problem with handoff to another system. These handoffs are known as "inter-carrier" handoffs (a handoff from one carrier's system to another's). If the other carrier is not a CDMA system operating on the same frequency as the first, then the CDMA system must perform a "blind" or "leap of faith" handoff wherein the mobile unit is instructed to change from one frequency to another, or from digital to analog, or both.

Therefore, a problem in the art is that calls may be lost due to a non-optional handoff or a handoff to an area that does not have a CDMA system, thus causing the call to be dropped.

SUMMARY OF THE INVENTION

This problem is solved and a technical advance is achieved in the art by a system and method for measuring the approximate distance and direction of a mobile unit from a plurality of cells in order to determine whether and how to handoff the mobile unit and which cell (or system) may be the best serving one. CDMA technology requires a precise and accurate timing system in order to function effectively. Each cell site or sector sends a pilot signal sequence on the same channel at a predefined time. By using this timing system in a manner not previously contemplated, this invention enables an estimate of the subscribing mobile's distance from the cell sites or sectors and; by using multiple distance estimates, the mobile's location may be determined by the CDMA system. This location information is then used to provide a unique mobile-assisted handoff. Additionally, this location information may be used to provide new services to the subscriber.

According to this invention, a distance calculation is made by the serving cell site first sending a request for signal strength to a mobile unit for each entry in the neighbor list. The mobile unit measures the signal strength of the cell sites or sectors on its neighbor list by measuring the power of the signal at the predefined time. The mobile unit, according to this invention, also measures a time offset of the start of the signal from the predefined time. The offset of the earliest arriving signal for each pilot signal is measured in "chips" (units of basic modulation rate) to determine the approximate distance of the mobile from each cell site or sector on the neighbor list. Manipulating the offset yields the time that the signal took to arrive from the mobile to the base station and hence the distance from the cell site. Furthermore, base station antennas are generally divided into faces (usually 3, each of which serves approximately 120° of the area covered by the base station). Given the antenna face that received the signal and the distance from each, a calculation of the position of the mobile unit may then be made.

A distance-assisted handoff may thus be implemented using this invention by measuring the distance from a plurality of cell sites or sectors of cell sites. This information may then be communicated to MTSO, ECP, or an offline processor in order to determine the location of the mobile unit The system may then perform a handoff, or decide not to, with a high degree of confidence that the call will be maintained.

Advantageously, new features may be provided using this invention. For example, if the mobile user sends a call for help ("911", "999," etc.) a general location for the mobile unit may be determined in a matter of a short period of time. Furthermore, services such as location of automobile breakdowns and accidents may be implemented.

Finally, a system according to this invention includes an adaptive database wherein a mobile unit is tracked, and, advantageously, a database is kept of successful handoffs to another cell or to another carrier. The mobile unit, when it is in a prescribed location (as determined according to the method described above), is instructed to hand off to another cell, or change frequency and/or operating mode (e.g., digital to analog) so that a smooth progression of handoffs may be accomplished. The success rate of these "leap of faith" handoffs may be determined and updated. Thus, when a mobile reaches a predetermined zone near the edge of the coverage area, or in a normal area of coverage but has low signal strength for whatever reason (e.g., multipath, etc.) the system can determine which type of handoff has previously been most successful and order a handoff with a high probability of success.

BRIEF DESCRIPTION OF THE DRAWING

A more complete understanding of the invention may be obtained from reconsideration of the following description in conjunction with the drawings, in which.

DETAILED DESCRIPTION

Figure 2:
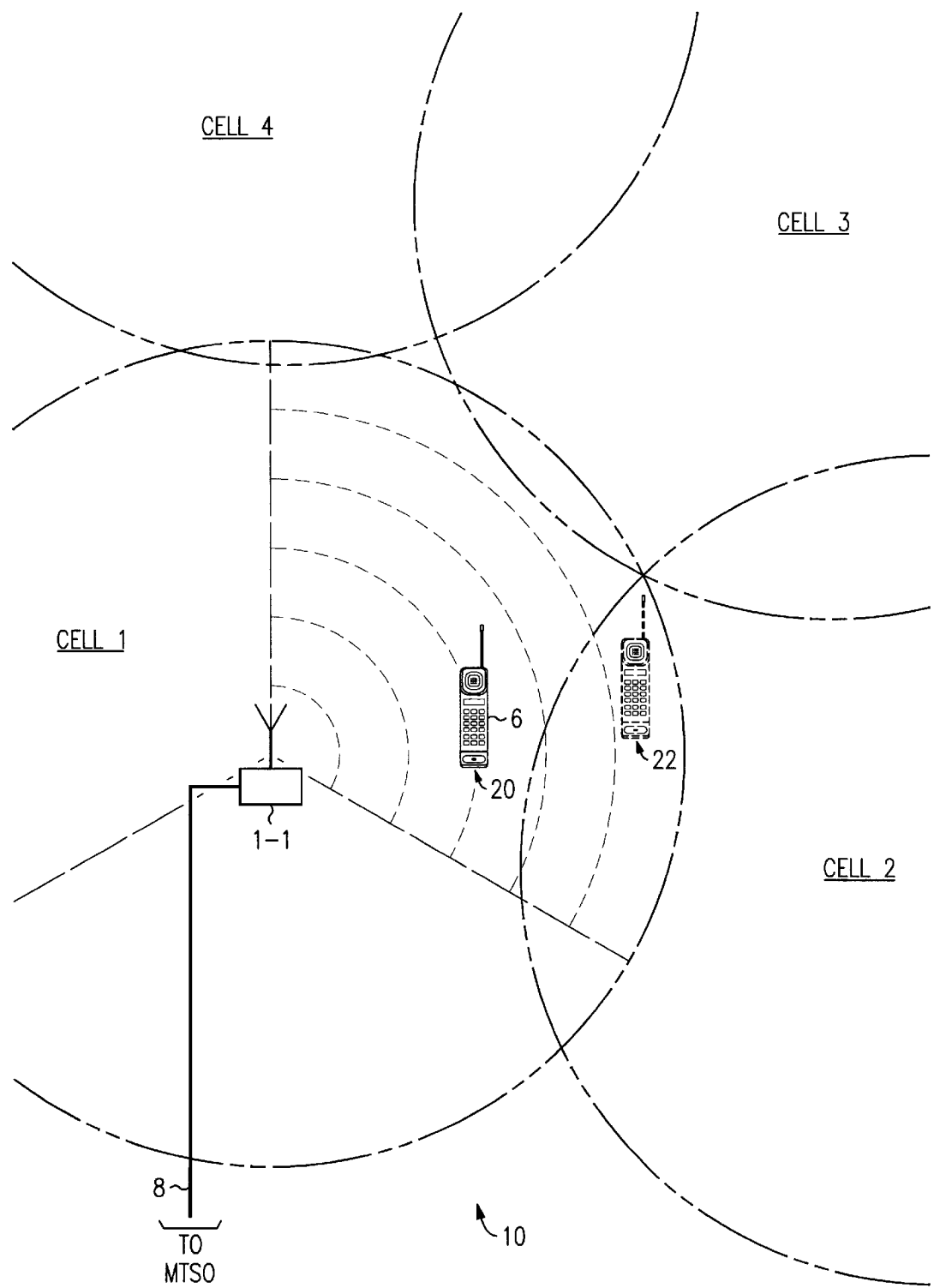
FIG. 2 is an illustration of a CDMA system using an exemplary embodiment of this invention.

FIG. 2 is a block diagram of a CDMA cellular telephone network where an exemplary embodiment of this invention may operate. CDMA network 10 comprises a plurality of cells 1–4 and a plurality of cell sites within each respective cell 1-1, and 4-4. Each cell site covers a predefined geographical area for mobile calls using CDMA. In this instance, there is a wireless unit 6 which uses CDMA wireless telephone service.

Each cell site is connected to a mobile telephone switching office (MTSO) via trunk 8. In reality, there would be many more cell sites connected to the MITSO than as illustrated here, but only four cell sites are illustrated for clarity. 35 MTSO connects mobile calls from the cell site through to the public switched telephone network. Each cell site is also connected to an executive call processor (ECP) (not shown but well known in the art) which aids in directing calls and locating mobiles, etc.

As stated above, in standard CDMA practice, mobile unit 6 monitors pilot signal strength from the surrounding cell sites and reports this information to the controlling cell site. In the scenario of FIG. 2, mobile unit 6 is being controlled by cell site 1-1 in cell 1. (The pilot signal strength is one of a plurality of parameters which are transmitted from all cell sites to mobile units according to CDMA standards, see the Qualcomm documents and the standards cited above). When the signal strength reaches a certain predetermined threshold, a handoff is initiated, based on the signal strength measured by mobile unit 6 of the adjacent cells (in this instance, cells 2 and 3). Mobile unit 6 is then shared between cell site 1-1 and the cell site with the highest measured pilot signal strength.

There are many situations in which such signal strength handoff decisions may not set up a handoff to the best serving cell. An example of such situations are in urban areas where steel buildings cause multipath among the signals; wherein a signal bouncing off of a building could indicate a temporarily lower signal strength level than the distance from the cell site normally would indicate. Another example is a geographical depression, such as a valley, where the mobile may not be receiving a pilot signal which is above a predetermined threshold from any cell. Such signal strength readings may cause the mobile to be handed off prematurely, to the second best serving cell, which may be to a distant cell site that cannot sustain the call. The call would be immediately handed off again, or, in the worst case, the call may be lost.

FIG. 2 illustrates such a false handoff scenario. In the scenario of FIG. 2, mobile unit 6 is illustrated in position 20, approximately halfway between cell site 1-1 and the edge of cell 1. However, in this hypothetical example, due to multipath and other effects, mobile unit 6 is reading signal strength from the pilot signal of cell 1 as if mobile unit 6 were at the edge of the cell 22 (shown in phantom). At this location, according to normal CDMA protocol, a handoff may occur if the pilot signal strength from one of the other cells is above a prescribed threshold. Cell site 1 provides a list of proximal cells (2 and 3), and mobile unit 6 is instructed to determine signal strength from the other cell sites. If no adequate pilot signals are measured, then no handoff is possible. If adequate pilot signal strengths are measured, it may not be best to indicate a handoff, as the call may not be able to be sustained at the new cell. Thus, a further means must be used to determine whether this call really needs to be handed off or not.

According to this invention, cell site 1-1 can determine how far mobile unit 6 is from the antenna face, in order to determine whether a handoff is really desirable. In this exemplary embodiment, cell site 1-1 sends a signal to mobile unit requesting signal strength reading of the cell sites (or sectors) on the neighbor list.

A is known in the art, when a cell site, such as 1-1 is in control of a call, it sends a signal to mobile 6 to synchronize its internal clock with the clock at cell site 1-1. Further, pilot signals from the various cells are broadcast on a prespecified channel during predetermined time periods. Thus, when mobile 6 is requested to determine pilot signal strength from cell sites on a neighbor list (delivered from cell site 1-1) mobile unit 6 determines the signal strength received at the prespecified time. Signal strength measurements are then made according to the prior art. Also, according to this invention, a determination is made of the offset of the start time of the pilot signal from the time expected by the mobile. This time offset for each of the prespecified pilot signals (from the neighbor list) is returned to cell site 1-1. Cell site 1-1 delivers this to a central location such as the MTSO, ECP, a base station or an offline processor. These time offsets are then analyzed by the central location. A determination is then made how many "chips" (significant unit of the modulation rate) the mobile is from each cell site.

Since the speed of the signal is known (the speed of light), and the serving antenna faces known, an approximate distance and location can be judged from the returning signal. According to an exemplary embodiment of this invention, each face of the cell is conceptually sub-divided into a plurality of concentric rings or "cylinders" (as in cylinders on a hard disk in a computer). Each cylinder represents a predetermined number of chips representing the signal propagation distance from cell site. By determining the cylinder that the mobile unit is in, a determination can then be made whether a handoff is necessary at that time or whether the mobile unit is just experiencing temporary signal strength fluctuation. Thus, according to this invention, handoffs determinations can be made more accurately.

According to this invention, in certain situations, a determination is made as to which cell site is closest in distance to mobile unit 6. This distance measurement is performed by triangulation among, for example, three cell sites (or faces of cell sites, depending on the cell site configuration). Of the many triangulation methods that are possible, this exemplary embodiment will discuss measuring a delay (D) between the mobile unit 6 and cell site 1-1, and the phase at which the signal is received. Using these two factors, a determination can be made and be applied to the equations (below) and a simple comparison can be made to determine the closest cell site.

Figure 1:
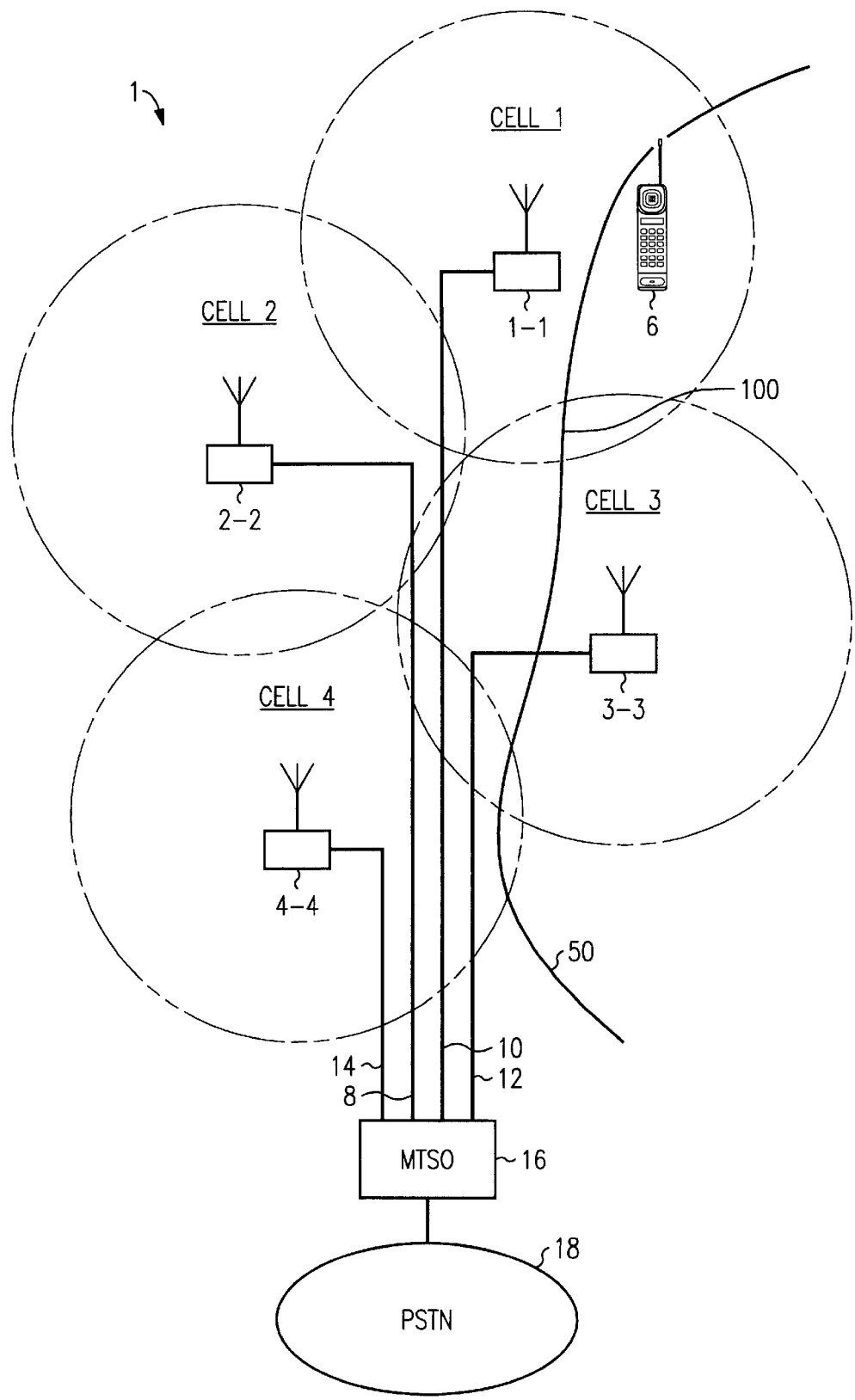
FIG. 1 is an illustration of a CDMA system according to the current art.

Such determination may be made at the mobile unit, the cell sites, or collected from the cell sites and made at the MTSO (or other centrally located processor). In this exemplary embodiment, the determination is made in the MTSO so that a simple comparison can be performed in order to make such determinations. In order to illustrate this invention (and returning to FIG. 1), consider the following scenario. As mobile 6 moves through the CDMA system on path 50, as it traverses the cells, it is served first by cell site 1-1 in cell 1, however, as mobile unit 6 approaches area 100 in its path 50, it determines a need for a handoff to another cell. Mobile unit 6 will receive pilot signals from cell sites 3-3 and 2-2, and possibly even 4-4. In a normal operation, mobile unit 6 sends a signal to cell sites 1-1 of the measured time offsets from cells 3-3, 2-2, and 4-4. A determination of distance (as shown below) can then be made based on the known cell site time offsets. This determination may be made at MTSO 16, which compares the distances and causes a handoff to the closest cell site (in this case cell site 3). Thus, a handoff may be performed which will provide better service for mobile unit 6 than the usual handoff procedure and, thus, preserve more calls and cause fewer handoffs.

According to this invention, therefore, an approximate location of a mobile unit may be rapidly determined. This new information may then be used to provide services not previously available. For example, when a mobile user makes an emergency call (911, 999, or whatever) it is known in the prior art that the location of the user may not be readily obtained without the user knowing his/her local geography and being able to relay such information. This may cause delays in providing a response when the user does not or cannot tell where he/she is. Now, when a call is received for an emergency number, the CDMA system can cause the mobile to make a determination of distance from a plurality of cell sites (or faces), which may be the neighbor list or may be a predetermined list to facilitate location determination. A location determination can then be made as described above, converted to map coordinated, and emergency crews dispatched to the determined location. Further, non-emergency numbers may cause the same location information to be gathered. For example, there could be a number to call if the mobile user runs out of gas (i.e., "*GAS") or has a flat tire or other mechanical breakdown. Additionally, a further predetermined number could be called for directions (i.e., "*LOST").

Figure 3:
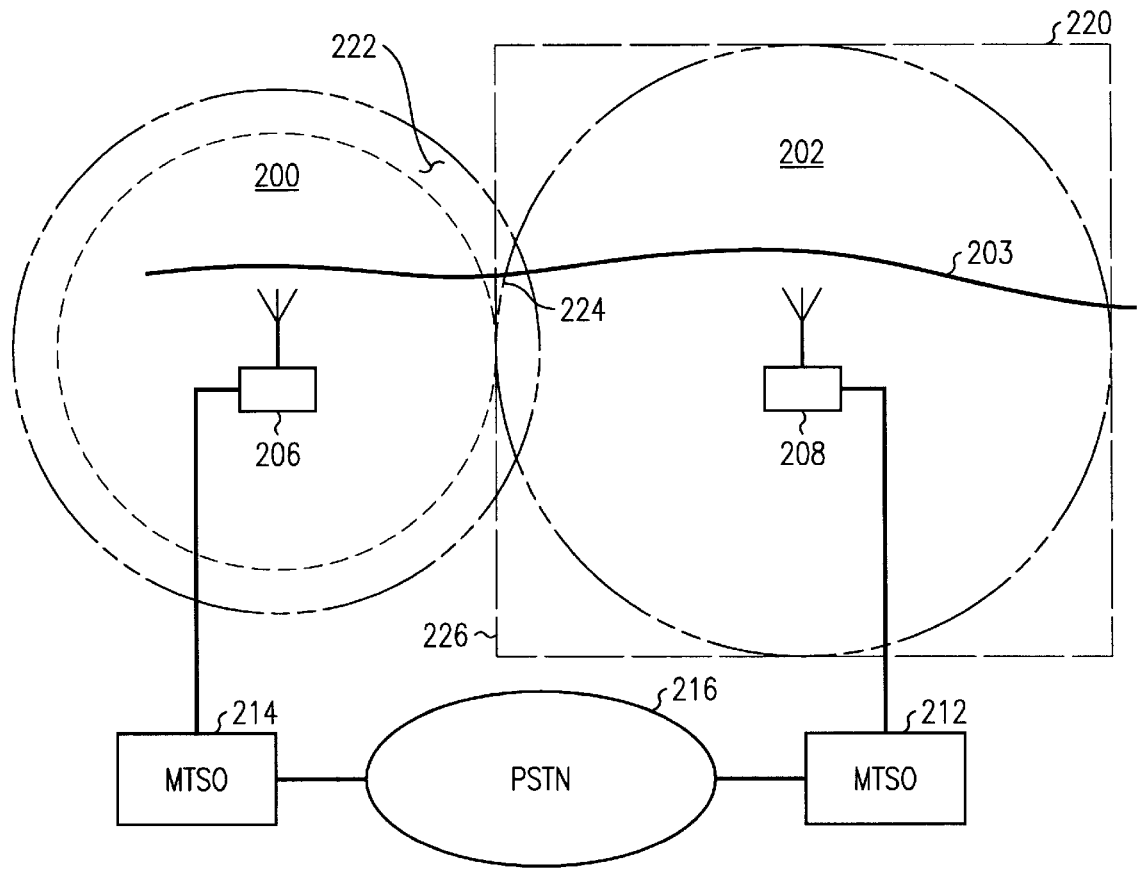
FIG. 3 is an example of using this invention to determine a blind handoff.

Turning now to FIG. 3, FIG. 3 is a diagram of a scenario when there is a CDMA system overlaid on an analog system to illustrate how this invention can aid in determining what type of handoff(s) is (are) necessary. In FIG. 3, there are two cells 200 and 202 illustrated, including their respective cell sites 206 and 208. In this exemplary embodiment, cell site 208 is connected to MTSO 212, and cell site 206 is connected to MTSO 214. Both MTSO 212 and 214 are connected to the public switched telephone network (PSTN) 216. Cell 202 is an analog cell as known in the art, and cell 200 is a CDMA cell.

Since CDMA cannot be used in analog cell 202, the mobile unit traversing path 203 must be handed off several times. According to an exemplary embodiment of this invention, as mobile unit traverses path 203 at point 224, mobile unit needs to be handed off from CDMA to analog. According to this invention, this determination can be made by measuring the distance from the antenna, or by measuring the change in distance and direction as mobile unit approaches analog cell 202.

As the mobile unit approaches analog cell 202, it moves into a predetermined (and tunable) soft handoff zone 222. The CDMA system queries a new database to determine what type of handoff and the target handoff cell and sector is most likely to be successful at this location, as measured by the above system. The CDMA system then attempts the type of handoff determined from its database lookup and, if such handoff is successful, updates the database. If a handoff is not successful, the system may attempt a different type of handoff. According to this scenario, a handoff to an analog system is found in the database to be the most successful.

At point 224, mobile unit is handed off from CDMA to the analog system by action of cell site 206 and MTSO 212. This is known in the art as a "hard" handoff. Thus, an exemplary embodiment of this invention may be used when a blind handoff is necessary to, for example, an analog mobile system in order to provide customers with apparently seamless service.

Figure 4:
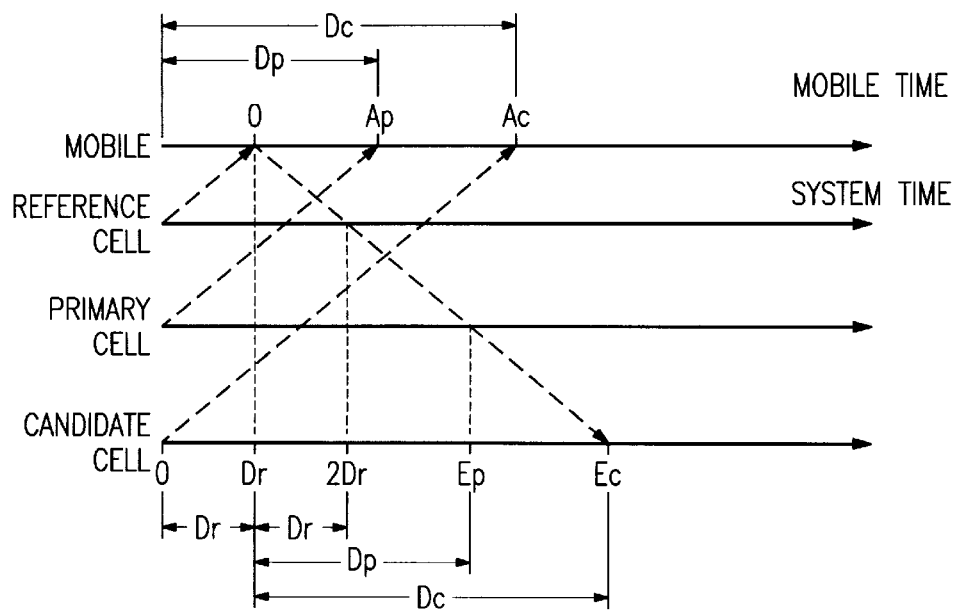
FIG. 4 is a graph illustrating the mathematical foundation of this invention.

Turning now to FIG. 4, the mathematical derivation of applicants' invention is shown. FIG. 4 is a graph of time verses distance delay in propagation of signals. In this scenario, the mobile is represented by the top line, "reference cell" is represented by the second line, "primary cell" by the third line, and the "candidate cell" by the bottom line. AP represents the arrival time of the signal from the primary cell at the mobile, relative to the mobile's time reference. AC is the arrival time of the candidate cell signal at the mobile, relative to the mobile time reference. Dr is the one way delay of the signal from the mobile to the reference cell (2Dr= round trip). Dp is the one way delay of signal from the mobile to the primary cell. Dc is the one way delay of signal from the mobile to the candidate cell. Ep, thus, is the earliest arrival time of the signal from the mobile at the primary cell and Ec is the earliest arrival time of the signal from the mobile at the candidate cell. In this manner, the following simple calculations can then be made:

$$Ec=Dc+Dr$$
$$Ep=Dp+Dr$$
$$Dp=Ap+Dr$$
$$Dc=Ac+Dr$$

Then, the delay times can be calculated by:

$$Dr=(Ep-Ap)/2$$
$$Dc=Ac+(Ep-Ap)/2 \text{ and}$$
$$Dp=(Ap+Ep)/2$$

It is to be understood that the above-described embodiment is merely an illustrative principle of the invention, and that many variations may be devised by those skilled in the art without departing from the scope of this invention. For example, a mobile unit equipped with a global positioning system (GPS) (such as described in Grimes, U.S. Patent No. 5,388,147, which issued to the assignee of this invention, and is incorporated herein by reference), may keep track of its position. Such position information may be relayed to a central location for determination of necessity of a handoff, or the mobile may be such determination based on position information relayed from the base station. It is, therefore, intended that such variations be included within the scope of the claim.

The invention claimed is:

1. A method for providing a telemetry assisted handoff in a wireless system, said wireless system including a plurality of cell sites serving a mobile station, said method comprising the steps of:

said mobile station measuring signal time offset of signals from each of a plurality of neighboring cells;

said mobile station sending a message to one of said cell sites, said message including said time offsets;

determining an approximate position of said mobile station by measuring said time offsets of signals from each of said plurality of neighboring cells;

consulting a record of available handoff destinations associated with said approximate position of said mobile station, said record including information about success or failure of prior handoff attempts to said destinations, and determining whether a handoff is appropriate to one of said available handoff destinations selected at least in part based on said information;

responsive to determining that a handoff is appropriate to one of said available handoff destinations, initiating a handoff; and responsive to determining that a handoff is not appropriate to one of said available handoff destinations, refraining from initiating a handoff, thus preventing premature handoff and potential loss of said call.

2. A method in accordance with claim 1 wherein said cell sites further include a plurality of directionally oriented faces, said method further including the step of:

determining which of said plurality of said directionally oriented faces received said response message, and responsive thereto determining an approximate location of said mobile station.

3. A method in accordance with claim 2, further including the step of:

responsive to determining that a handoff is appropriate to one of said available handoff destinations and to said determination of which of said plurality of said directionally oriented faces received said message, causing a handoff to one of a predetermined list of other cell sites.

4. A method for providing a telemetry assisted blind handoff in wireless system, said wireless system including a plurality of cell sites serving a mobile station, said method comprising the steps of:

said mobile station measuring signal strength and time offset of signals from each of a plurality of neighboring cells;

said mobile station sending a message to one of said cell sites said message including said signal strength and said time offsets;

determining an approximate distance of said mobile station from said neighboring cells based on said time offsets;

determining whether said approximate distance is indicative of said mobile station being in a predetermined zone; and responsive to determining that said mobile station is in said predetermined zone, said one base station initiating a handoff by consulting a record of available handoff destinations associated with said zone, said record including information about success or failure of prior handoff attempts to said destinations, and causing said mobile to execute a handoff to one of said available handoff destinations selected at least in part based on said information.

5. A method in accordance with claim 4 wherein said cell sites further includes a plurality of directionally oriented faces, said method further including the step of:

determining which of said plurality of said directionally oriented faces received said message, and responsive thereto, determining an approximate location of said mobile station.

6. A method in accordance with claim 5, wherein said predetermined zone corresponds to a handoff zone near an end of a predetermined coverage region of said one base station, further including the step of:

responsive to determining that said mobile station is in said zone and to said determination of which of said plurality of said directionally oriented faces received said message, causing a handoff to one of a predetermined list of other cell sites.

7. A method in accordance with claim 4 wherein said handoff includes said mobile station changing frequencies.

8. A method in accordance with claim 4 wherein said handoff includes said mobile station changing from analog mode to digital mode.

9. A method in accordance with claim 4 wherein said one of said cell sites is part of a first service region and at least one of said available handoff destinations includes at least one cell site located in a service region different from said first service region.

10. A method in accordance with claim 4 wherein said one of said cell sites is part of a first service region and further including the step of:

causing said mobile to initiate a handoff to a cell site located in a service region different from said first service region.

11. The method of claim 4 wherein for at least one of said available handoff destinations information with respect to strength at said mobile station of a signal transmitted by such handoff destination is not available.

12. The method of claim 4 wherein for at least one of said available handoff destinations information with respect to strength at such handoff destination of a signal transmitted by said mobile station is not available.

13. A method for providing a telemetry assisted handoff in a wireless system, said wireless system including a plurality of cell sites serving a mobile station, said method comprising the steps of:

said mobile station measuring signal time offset of signals from at least two neighboring cells;

said mobile station sending a message to one of said cell sites, said message including said time offsets;

determining an approximate position of said mobile station by measuring said time offsets of signals from said at least two neighboring cells;

consulting a record of available handoff destinations associated with said approximate position of said mobile station, said record including information about success or failure of prior handoff attempts to said destinations, and determining whether a handoff is appropriate to one of said available handoff destinations selected at least in part based on said information;

responsive to determining that a handoff is appropriate to one of said available handoff destinations, initiating a handoff;

and, responsive to determining that a handoff is appropriate to one of said available handoff destinations, refraining from initiating a handoff, thus preventing premature handoff and potential loss of said call.

14. A method in accordance with claim 13 wherein said cell sites further include a plurality of directionally oriented faces, said method further including the step of:

determining which of said plurality of said directionally oriented faces received said message, and responsive thereto determining an approximate location of said mobile station.

15. A method in accordance with claim 14, further including the step of:

responsive to determining that said a handoff is appropriate to one of said available handoff destinations, and to said determination of which of said plurality of said directionally oriented faces received said response message, causing a handoff to one of a predetermined list of other cell sites.

* * * * *